United States Patent
Ide et al.

(10) Patent No.: US 9,981,562 B2
(45) Date of Patent: May 29, 2018

(54) POWER SUPPLY SYSTEM

(71) Applicant: TOYOTA JIDOSHA KABUSHIKI KAISHA, Toyota-shi, Aichi-ken (JP)

(72) Inventors: Akihiko Ide, Okazaki (JP); Hidetsugu Hamada, Toyota (JP); Masatoshi Shinohara, Toyota (JP); Shohei Sunahara, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 315 days.

(21) Appl. No.: 14/885,138

(22) Filed: Oct. 16, 2015

(65) Prior Publication Data
US 2016/0111881 A1  Apr. 21, 2016

(30) Foreign Application Priority Data
Oct. 17, 2014  (JP) .................. 2014-212227

(51) Int. Cl.
| | |
|---|---|
| *B60L 11/18* | (2006.01) |
| *H02J 3/38* | (2006.01) |
| *H02M 7/48* | (2007.01) |
| *H02J 7/00* | (2006.01) |

(52) U.S. Cl.
CPC .............. *B60L 11/18* (2013.01); *H02J 3/38* (2013.01); *H02J 7/0024* (2013.01); *H02M 7/48* (2013.01); *Y02T 10/7055* (2013.01)

(58) Field of Classification Search
CPC .......... B60L 11/18; H02J 3/38; H02J 7/0024; H02M 3/158; H02M 7/48; Y02T 10/7055; Y10T 307/653

USPC ..................................... 307/52, 71
See application file for complete search history.

(56) References Cited

U.S. PATENT DOCUMENTS

| | | | | |
|---|---|---|---|---|
| 9,647,544 | B2 * | 5/2017 | Ishigaki | H02M 3/158 |
| 2013/0119961 | A1 * | 5/2013 | Okuda | H02M 3/158 323/299 |
| 2013/0134786 | A1 * | 5/2013 | Ishigaki | H02M 3/158 307/71 |
| 2014/0145694 | A1 * | 5/2014 | Ishigaki | H02J 1/06 323/271 |
| 2014/0265605 | A1 * | 9/2014 | Ishigaki | H02M 3/158 307/80 |
| 2015/0077085 | A1 * | 3/2015 | Chen | H02M 3/158 323/299 |
| 2016/0105126 | A1 | 4/2016 | Sunahara et al. | |

FOREIGN PATENT DOCUMENTS

| | | | |
|---|---|---|---|
| DE | 102015117169 A1 | 4/2016 | |
| JP | 2013-013234 A | 1/2013 | |
| WO | WO2013/001989 | * 1/2013 | H02M 3/158 |

* cited by examiner

*Primary Examiner* — Levi Gannon
(74) *Attorney, Agent, or Firm* — Sughrue Mion, PLLC

(57) ABSTRACT

A power supply system includes: a first battery; a second battery; a voltage converter including a plurality of switching elements; and a controller configured to turn on or off the plurality of switching elements in accordance with pulse width modulation control. The controller is configured to control phases of the pulse width modulation control signals such that the first high-level period of the first pulse width modulation control signal and the second high-level period of the second pulse width modulation control signal do not overlap with each other at a predetermined condition.

6 Claims, 12 Drawing Sheets

POWER SUPPLY SYSTEM

INCORPORATION BY REFERENCE

The disclosure of Japanese Patent Application No. 2014-212227 filed on Oct. 17, 2014 including the specification, drawings and abstract is incorporated herein by reference in its entirety.

BACKGROUND OF THE INVENTION

1. Field of the Invention

The invention relates to the structure of a power supply system and particularly to a controller for a system that includes two parallel-connected power supplies and that converts voltage through PWM control.

2. Description of Related Art

Generally, there are many voltage converters that are used to convert the voltage of a battery by turning on or off switching elements through pulse width modulation control. In recent years, there is suggested a power supply system that uses a voltage converter composed of four switching elements and including a series mode and a parallel mode (see, for example, Japanese Patent Application Publication No. 2013-13234 (JP 2013-13234 A). In the series mode, voltage is converted in a state where two batteries are connected in series with each other by a combination of on/off operations of the switching elements. In the parallel mode, voltage is converted in a state where the two batteries are connected in parallel with each other by a combination of on/off operations of the switching elements. When the voltage converter that is used in this kind of power supply system is operated in the parallel mode, voltage conversion control over the batteries is executed by turning on or off the switching elements in accordance with two pulse width modulation control signals corresponding to the two batteries. There is suggested in JP 2013-13234 A that, when this kind of voltage converter is operated in the parallel mode, a loss of the switching elements is suppressed by changing the phases of the two pulse width modulation control signals.

Incidentally, there is known that, in an existing voltage converter that converts the voltage of a battery through on/off operations of switching elements, an electromagnetic sound arises because of the on/off operations of the switching elements. Because the electromagnetic sound is cacophonous noise when the electromagnetic sound falls within the human audible range, there has been studied, for example, a method, or the like, that reduces noise by raising the carrier frequency of pulse width modulation control to raise the frequency of the electromagnetic sound beyond the audible range. However, noise reduction for the power supply system that uses the voltage converter that executes voltage conversion control over the two batteries by using the two pulse width modulation control signals as described in JP 2013-13234 A has not been sufficiently studied.

SUMMARY OF THE INVENTION

The invention provides a power supply system that reduces noise in the power supply system that executes voltage conversion control over two batteries by using two pulse width modulation control signals.

A power supply system in an aspect of the invention includes: a first battery; a second battery; a voltage converter including a plurality of switching elements, the switching elements being configured to bidirectionally convert voltage between one or both of the first battery and the second battery and an output power line and switch connection of the first battery and the second battery to the output power line between series connection and parallel connection; and a controller configured to turn on or off the plurality of switching elements in accordance with pulse width modulation control. The output power line includes a first power line and a second power line lower in potential than the first power line. The plurality of switching elements include first, second, third and fourth switching elements provided in series with each other in order from the first power line toward the second power line. The first battery is connected in parallel with the third and fourth switching elements. The second battery is connected in parallel with the second and third switching elements. The controller is configured to, when a total high-level period that is a total period of a first high-level period and a second high-level period is shorter than a duty cycle period, control phases of the pulse width modulation control signals such that the first high-level period and the second high-level period do not overlap with each other, the first high-level period being a high-level period of a first pulse width modulation control signal for controlling first voltage conversion of a first voltage conversion circuit established between the first battery and the output power line, the second high-level period being a high-level period of a second pulse width modulation control signal for controlling second voltage conversion of a second voltage conversion circuit established between the second battery and the output power line, the duty cycle period being a total period of low-level periods of pulse width modulation control signals and a corresponding one of the high-level periods of the pulse width modulation control signals.

In the above aspect, the controller may be configured to, when each of the high-level periods of the pulse width modulation control signals is lower than 50% of the duty cycle period, control the phases of the pulse width modulation control signals such that the high-level periods alternately appear once every half period of the duty cycle period.

A power supply system in a second aspect of the invention includes: a first battery; a second battery; a voltage converter including a plurality of switching elements, the switching elements being configured to bidirectionally convert voltage between one or both of the first battery and the second battery and an output power line and switch connection of the first battery and the second battery to the output power line between series connection and parallel connection; and a controller configured to turn on or off the plurality of switching elements in accordance with pulse width modulation control. The output power line includes a first power line and a second power line lower in potential than the first power line. The plurality of switching elements include first, second, third and fourth switching elements provided in series with each other in order from the first power line toward the second power line. The first battery is connected in parallel with the third and fourth switching elements. The second battery is connected in parallel with the second and third switching elements. The controller is configured to, when a total high-level period that is a total period of a first high-level period and a second high-level period is shorter than a duty cycle period, execute phase control by mixing first control with second control, the first high-level period being a high-level period of a first pulse width modulation control signal for controlling first voltage conversion of a first voltage conversion circuit established between the first battery and the output power line, the second high-level period being a high-level period of a second pulse width modulation control signal for controlling second voltage conversion of a second voltage conversion circuit established between the second battery and the output power line, the duty cycle period being a total period of each of low-level periods of the pulse width modulation control signals and a corresponding one of the high-level periods of the pulse width modulation control signals, the first control being control in which phases of the pulse width modulation control signals are controlled such that the first high-level period of the first pulse width modulation control signal and the second high-level period of the second pulse width modulation control signal overlap with each other, the second control being control in which the phases of the pulse width modulation control signals are controlled such that the first high-level period of the first pulse width modulation control signal and the second high-level period of the second pulse width modulation control signal do not overlap with each other.

A power supply system in a third aspect of the invention includes: a first battery; a second battery; a voltage converter including a plurality of switching elements, the switching elements being configured to bidirectionally convert voltage between one or both of the first battery and the second battery and an output power line and switch connection of the first battery and the second battery to the output power line between series connection and parallel connection; a controller configured to turn on or off the plurality of switching elements in accordance with pulse width modulation control. The output power line includes a first power line and a second power line lower in potential than the first power line. The plurality of switching elements include first, second, third and fourth switching elements provided in series with each other in order from the first power line toward the second power line. The first battery is connected in parallel with the third and fourth switching elements. The second battery is connected in parallel with the second and third switching elements. The controller is configured to, during a period in which a first pulse width modulation control signal for controlling first voltage conversion of a first voltage conversion circuit established between the first battery and the output power line is at a low level, change a second pulse width modulation control signal for controlling second voltage conversion of a second voltage conversion circuit established between the second battery and the output power line from a low level to a high level and then return to the low level.

In the above aspect, the controller may be configured to generate the first pulse width modulation control signal based on a first triangular wave and a first threshold, generate the second pulse width modulation control signal based on a second triangular wave and a second threshold, and, during the period in which the first pulse width modulation control signal is at the low level, raise a frequency of the second triangular wave beyond a frequency of the first triangular wave.

In the above aspect, the controller may be configured to, during the period in which the first pulse width modulation control signal is at the low level, raise the frequency of the second triangular wave beyond the frequency of the first triangular wave such that a period during which a value of the second triangular wave exceeds the second threshold and a period during which the value of the second triangular wave does not exceed the second threshold appear.

According to the above aspects of the invention, it is possible to reduce noise in a power supply system that uses a voltage converter that executes voltage conversion control over two batteries by using two pulse width modulation control signals.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a power supply system 100 according to the invention will be described with reference to the accompanying drawings. In the description of the following embodiment, the power supply system 100 supplies electric power to a motor generator 50 of an electromotive vehicle 200. Instead, the power supply system 100 may supply electric power to a motor or motor generator of a general purpose machine.

Figure 1:
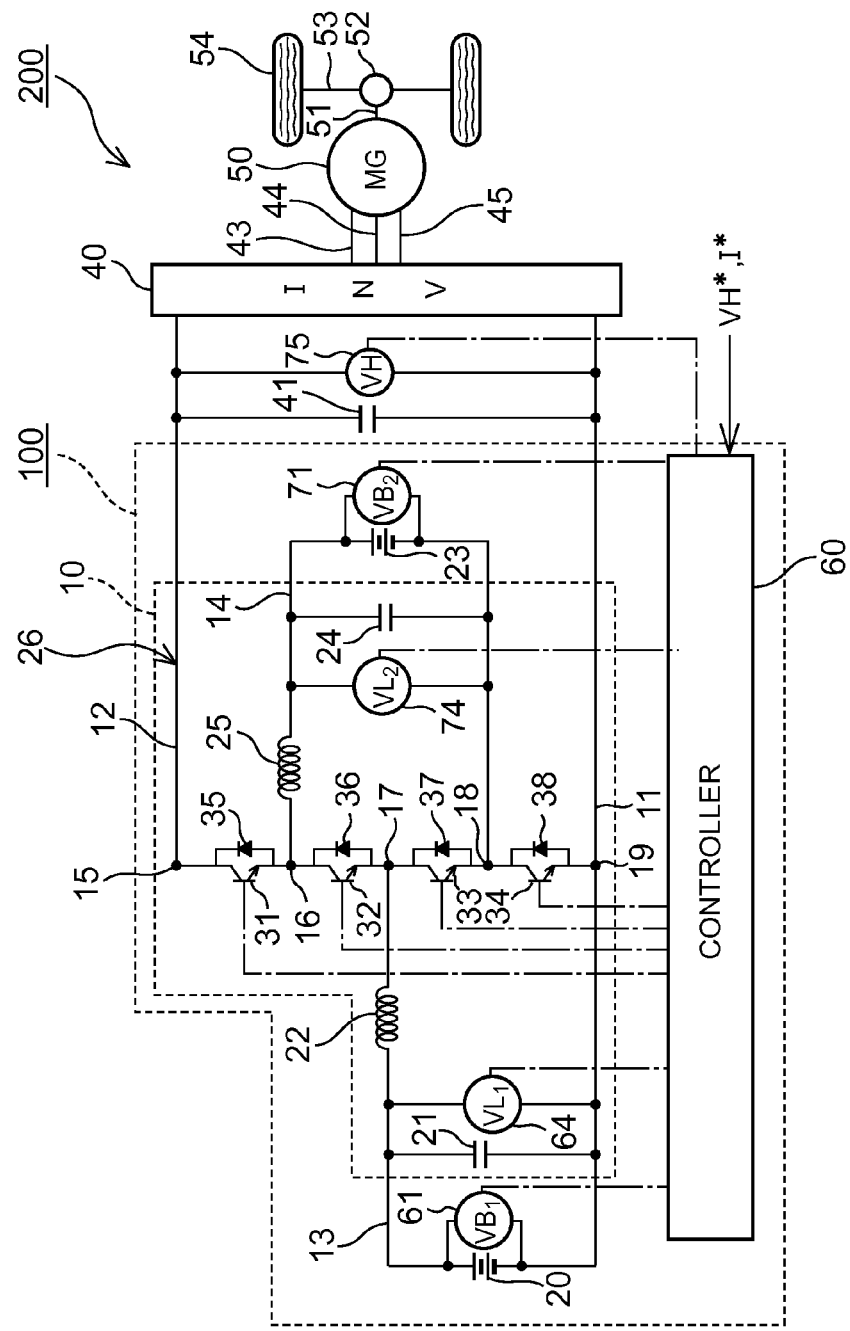
FIG. 1 is a system line diagram that shows the configuration of a power supply system according to the invention, which is mounted on an electromotive vehicle.

As shown in FIG. 1, the power supply system 100 according to the invention includes a first battery 20, a second battery 23, a voltage converter 10 and a controller 60. The voltage converter 10 includes a plurality of switching elements 31 to 34, a first reactor 22, a second reactor 25, a first capacitor 21, a second capacitor 24 and an output power line 26. The controller 60 turns on or off the plurality of switching elements 31 to 34. A smoothing capacitor 41 and an inverter 40 are connected to the output power line 26. The motor generator 50 is connected to the inverter 40. The motor generator 50 drives the electromotive vehicle 200. The alternate long and short dashed lines in FIG. 1 indicate signal lines.

The output power line 26 of the voltage converter 10 includes a high-voltage power line 12 and a reference power line 11. The high-voltage power line 12 outputs high voltage stepped up by the voltage converter 10. The reference power line 11 is connected to the minus side of each of the batteries 20, 23, and has a lower potential than the high-voltage power line 12. The plurality of switching elements 31 to 34 are connected in series with each other from the high-voltage power line 12 toward the reference power line 11. Diodes 35 to 38 are respectively connected in antiparallel with the switching elements 31 to 34. The voltage converter 10 includes a first power line 13 and a second power line 14. The first power line 13 connects a second connection point 17 with the reference power line 11. The second connection point 17 is located between the switching element 32 and the switching element 33. The second power line 14 connects a first connection point 16 with a third connection point 18. The first connection point 16 is located between the switching element 31 and the switching element 32. The third connection point 18 is located between the switching element 33 and the switching element 34. The first battery 20 and the first reactor 22 are arranged in series with each other in the first power line 13. The second battery 23 and the second reactor 25 are arranged in series with each other in the second power line 14. The first capacitor 21 is connected in parallel with the first battery 20. The second capacitor 24 is connected in parallel with the second battery 23. The smoothing capacitor 41 is connected between the high-voltage power line 12 and the reference power line 11. In this way, the first battery 20 is connected in parallel with the switching elements 33, 34, and the second battery 23 is connected in parallel with the switching elements 32, 33.

A voltage sensor 61 is installed in the first battery 20, and detects a voltage VB1. A voltage sensor 71 is installed in the second battery 23, and detects a voltage VB2. A voltage sensor 64 is connected between the first power line 13 and the reference power line 11, and detects a voltage VL1 between both ends of the first capacitor 21. A voltage sensor 74 is connected to the second power line 14, and detects a voltage VL2 between both ends of the second capacitor 24. A voltage sensor 75 is connected between the high-voltage power line 12 and the reference power line 11, and detects a voltage VH between both ends of the smoothing capacitor 41.

The inverter 40 includes a plurality of switching elements (not shown) inside, and converts direct-current power, output from the output power line 26 of the voltage converter 10 through on/off operations of the switching elements, to three-phase (U, V, W) alternating-current power, and outputs the three-phase alternating-current power to output lines 43, 44, 45 of the respective phases. The output power line 26 is composed of the reference power line 11 and the high-voltage power line 12. The U-phase, V-phase and W-phase output lines 43, 44, 45 are connected to the motor generator 50. An output shaft 51 of the motor generator 50 is connected to a gear unit 52. Axles 53 are connected to the gear unit 52. Wheels 54 are mounted on the axles 53.

The controller 60 is a computer that includes a CPU, a storage unit and a device and sensor interface. The CPU executes arithmetic and information processing. The storage unit stores control programs and control data. Devices and sensors are connected to the device and sensor interface. The CPU, the storage unit and the device and sensor interface are connected to one another via a data bus. The switching elements 31 to 34 of the voltage converter 10 are connected to the controller 60 via the device and sensor interface, and turn on or off in response to commands from the controller 60. The voltage sensors 61, 64, 71, 74, 75 are connected to the controller 60 via the device and sensor interface. Data detected by the sensors are input to the controller 60. A high-voltage command value VH* and a current command value I* are input from another controller to the controller 60.

Basic Operation of Voltage Converter 10

The voltage converter 10 is able to bidirectionally convert voltage between one or both of the first and second batteries 20, 23 and the output power line 26 so as to step up the voltage of at least one of the first battery 20 or the second battery 23 and output the stepped-up voltage to the output power line 26 or step down the voltage of the output power line 26 and charge one or both of the first and second batteries 20, 23 with the stepped-down voltage by switching the on/off operation pattern of the four switching elements 31 to 34, and is also able to switch connection of the first and second batteries 20, 23 to the output power line 26 between series connection and parallel connection. Hereinafter, the basic operations of the voltage converter 10 in the case where the first and second batteries 20, 23 are connected in parallel with each other will be simply described with reference to FIG. 2 to FIG. 4. In the following description, the first switching element 31 is referred to as S1(31) by using the symbol S1 and the sign 31, the second switching element 32 is referred to as S2(32) by using the symbol S2 and the sign 32, the third switching element 33 is referred to as S3(33) by using the symbol S3 and the sign 33, and the fourth switching element 34 is referred to as S4(34) by using the symbol S4 and the sign 34. The diodes 35 to 38 respectively connected in antiparallel with the switching elements 31 to 34 are referred to as D1(35) to D4(38) by using the symbols D1 to D4 and the signs 35 to 38. Similarly, the first battery 20 and the second battery 23 are respectively referred to as B1(20) and B2(23) by using the symbols B1, B2 and the signs 20, 23, the first and second capacitors 21, 24 are respectively referred to as C1(21) and C2(24) by using the symbols C1, C2 and the signs 21, 24, and the first and second reactors 22, 25 are respectively referred to as L1(22) and L2(25) by using the symbols L1, L2 and the signs 22, 25. Each of the switching elements 31 to 34 is a semiconductor element, such as an IGBT, that allows current to flow only in the arrow direction in FIG. 1 in an on state and that does not allow current to flow in the direction opposite to the arrow direction. However, in FIG. 3, FIG. 4, FIG. 6, and FIG. 7, for the sake of illustrating the on/off states of the switching elements 31 to 34, the switching elements 31 to 34 are shown as simple on-off switches.

Step-Up/Step-Down Operation in Parallel-Connected B1(20) and B2(23)

The step-up/step-down operation in the case where the B1(20) and the B2(23) in the voltage converter 10 are connected in parallel with each other will be described with reference to FIG. 2 to FIG. 5.

Figure 2:
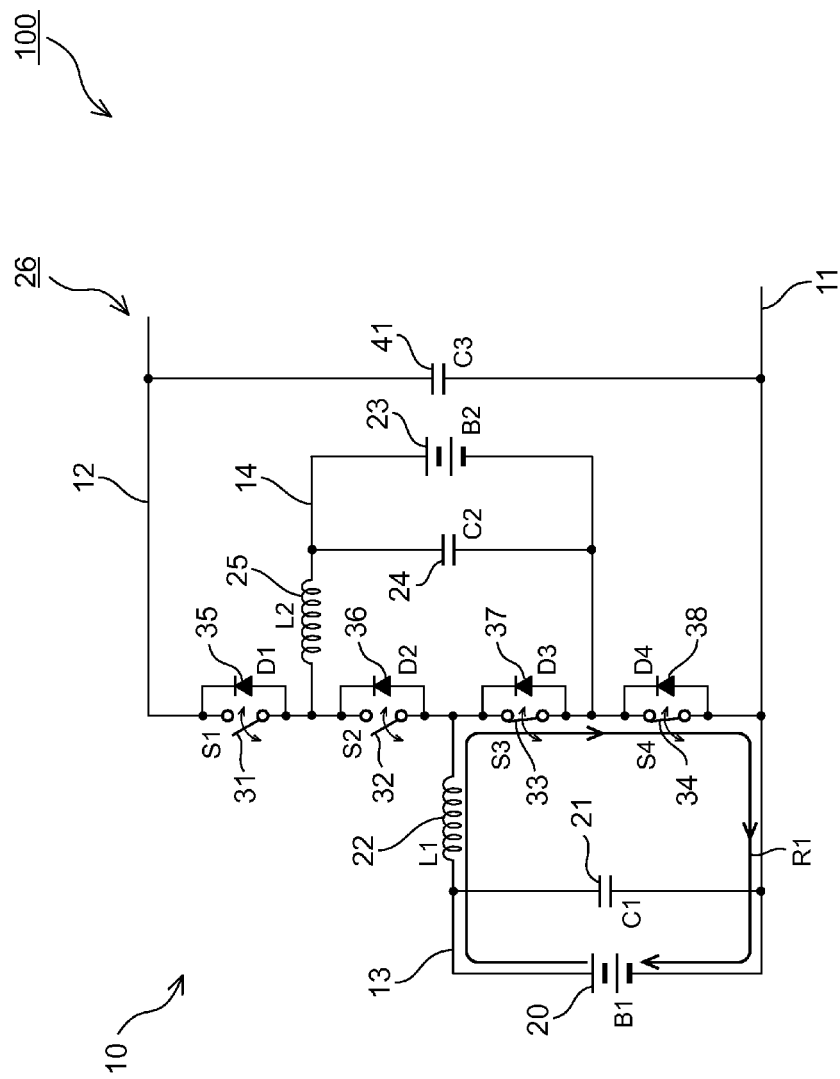
FIG. 2 is a view that illustrates the flow of current at the time when a first reactor is charged by a first battery in basic operations of the power supply system according to the invention.
Figure 3:
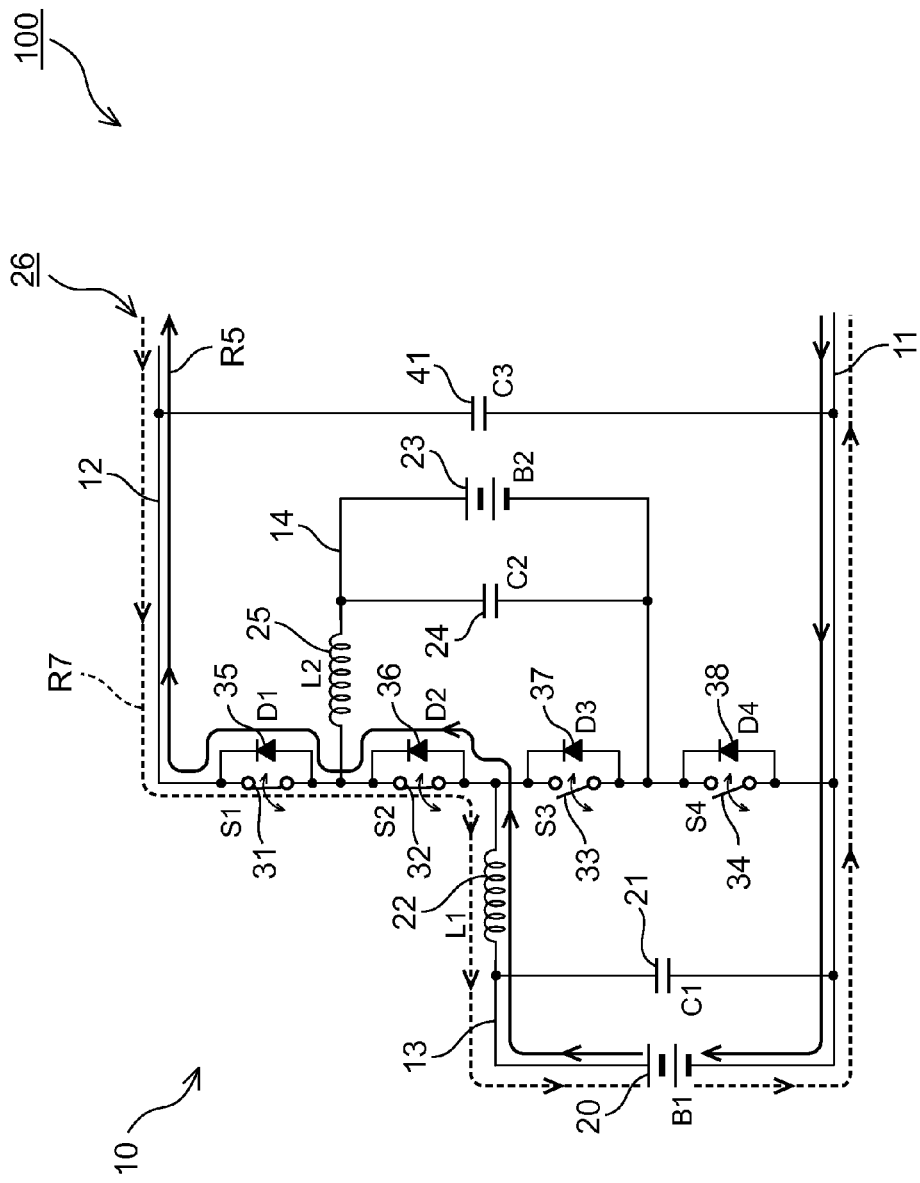
FIG. 3 is a view that illustrates the flow of current at the time when electric power charged in the first reactor is output to an output power line in the basic operations of the power supply system according to the invention.

Initially, first voltage conversion between the B1(20) and the output power line 26 will be described with reference to FIG. 2 and FIG. 3. As shown in FIG. 2, a circuit R1 through which current flows in order of the B1(20), the L1(22), the S3(33), the S4(34) and the B1(20) is established by turning on the pair of S3(33) and S4(34) and turning off the pair of S1(31) and S2(32), and electric power output from the B1(20) returns through the circuit R1 and is charged into the L1(22). Subsequently, as shown in FIG. 3, a circuit R5 (indicated by the continuous line) through which current flows in order of the B1(20), the L1(22), the D2(36), the D1(35), the high-voltage power line 12, the reference power line 11 and the B1(20) and a circuit R7 (indicated by the broken line) through which current flows in order of the high-voltage power line 12, the S1(31), the S2(32), the L1(22), the B1(20), the reference power line 11 and the high-voltage power line 12 are established by turning off the pair of S3(33) and S4(34) and turning on the pair of S1(31) and S2(32), electric power charged in the L1(22) is output to the output power line 26 through the circuit R5, and electric power regenerated from the motor generator 50 is charged into the B1(20) through the circuit R7 (indicated by the broken line). When the pair of S1(31) and S2(32) are turned off during regeneration, electric power charged in the L1(22) is recovered by the B1(20) through a current circuit in the direction reverse to the circuit R1. The voltage VB1 of the B1(20) is stepped up and output to the output power line 26 by alternately repeating a first on period and a first off period. During the first on period, the pair of S3(33) and S4(34) are turned on, while at least one of the S1(31) or the S2(32) is turned off. During the first off period, the S1(31) and the S2(32) are turned on, while at least one of the S3(33) or the S4(34) is turned off.

In this way, in the voltage converter 10, a bidirectional step-up chopper circuit is established. In the bidirectional step-up chopper circuit, the pair of S3(33) and S4(34) are switching elements (first equivalent lower arm elements) that are turned on at the time when the L1(22) is charged by the B1(20), and the pair of S1(31) and S2(32) are switching elements (first equivalent upper arm elements) that are turned on at the time when electric power is output. The step-up chopper circuit includes the circuit R1 described with reference to FIG. 2 and the circuits R5, R7 described with reference to FIG. 3, and is a first voltage conversion circuit. The first voltage conversion circuit is established between the B1(20) and the output power line 26, and carries out first voltage conversion between the B1(20) and the output power line 26.

The total period of the first on period and the first off period in the first voltage conversion circuit is a duty cycle period. The ratio of the first on period to the duty cycle period is a first duty ratio D1. In the first voltage conversion circuit, at the time when the voltage VB1 of the B1(20) is stepped up to the high-voltage command value VH*, the pair of S1(31) and S2(32) (the first equivalent upper arm elements) and the pair of S3(33) and S4(34) (the first equivalent lower arm elements) are subjected to pulse width modulation control (PWM control) such that the relationship among the first duty ratio D1, the high-voltage command value VH* and the voltage VB1 of the B1(20) is expressed by the following mathematical expression (1).

$$VH^* = [1/(1-D1)] \times VB1 \tag{1}$$

In actual control, the pair of S1(31) and S2(32) (the first equivalent upper arm elements) and the pair of S3(33) and S4(34) (the first equivalent lower arm elements) are subjected to PWM control such that VL1 that is the voltage between both ends of the C1(21) is used instead of VB1 and the relationship is expressed by the following mathematical expression (2).

$$VH^* = [1/(1-D1)] \times VL1 \tag{2}$$

A control signal for this PWM control is termed first pulse width modulation control signal.

Figure 4:
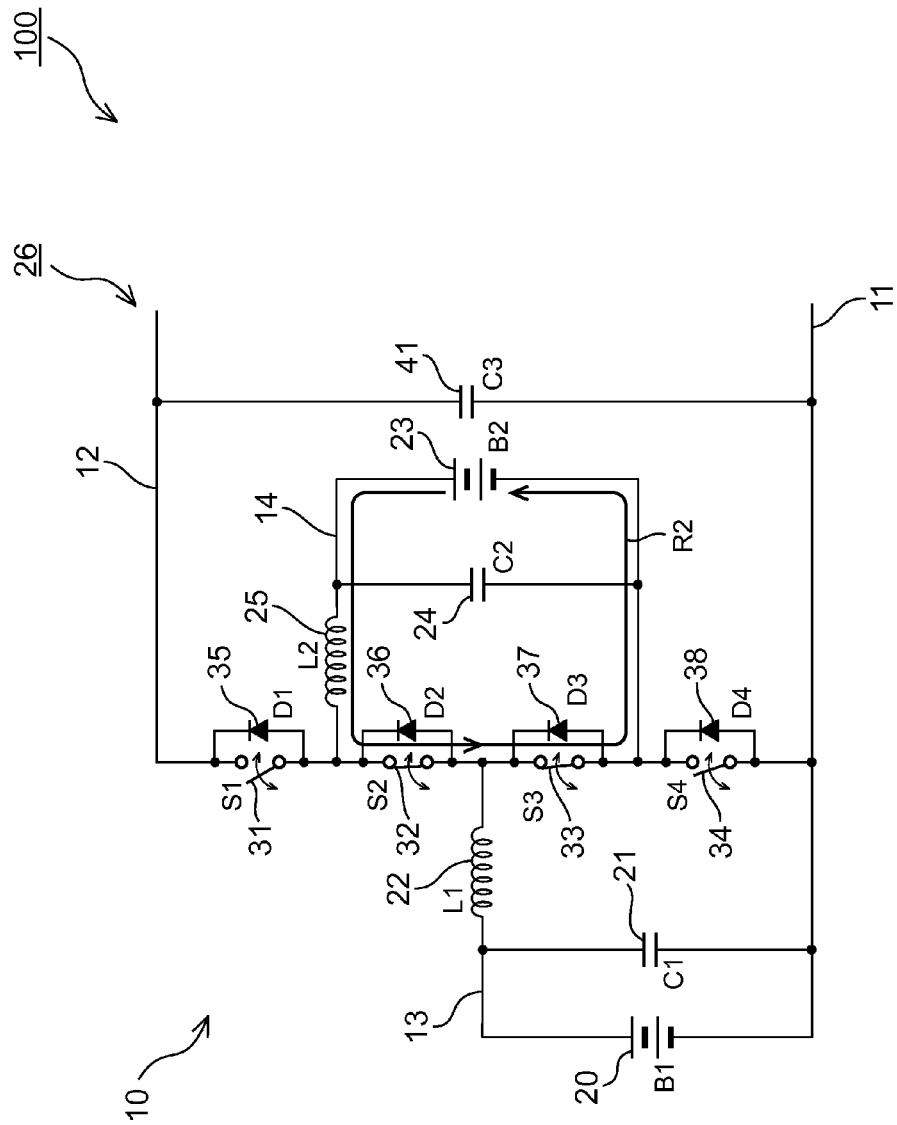
FIG. 4 is a view that illustrates the flow of current at the time when a second reactor is charged by a second battery in the basic operations of the power supply system according to the invention.
Figure 5:
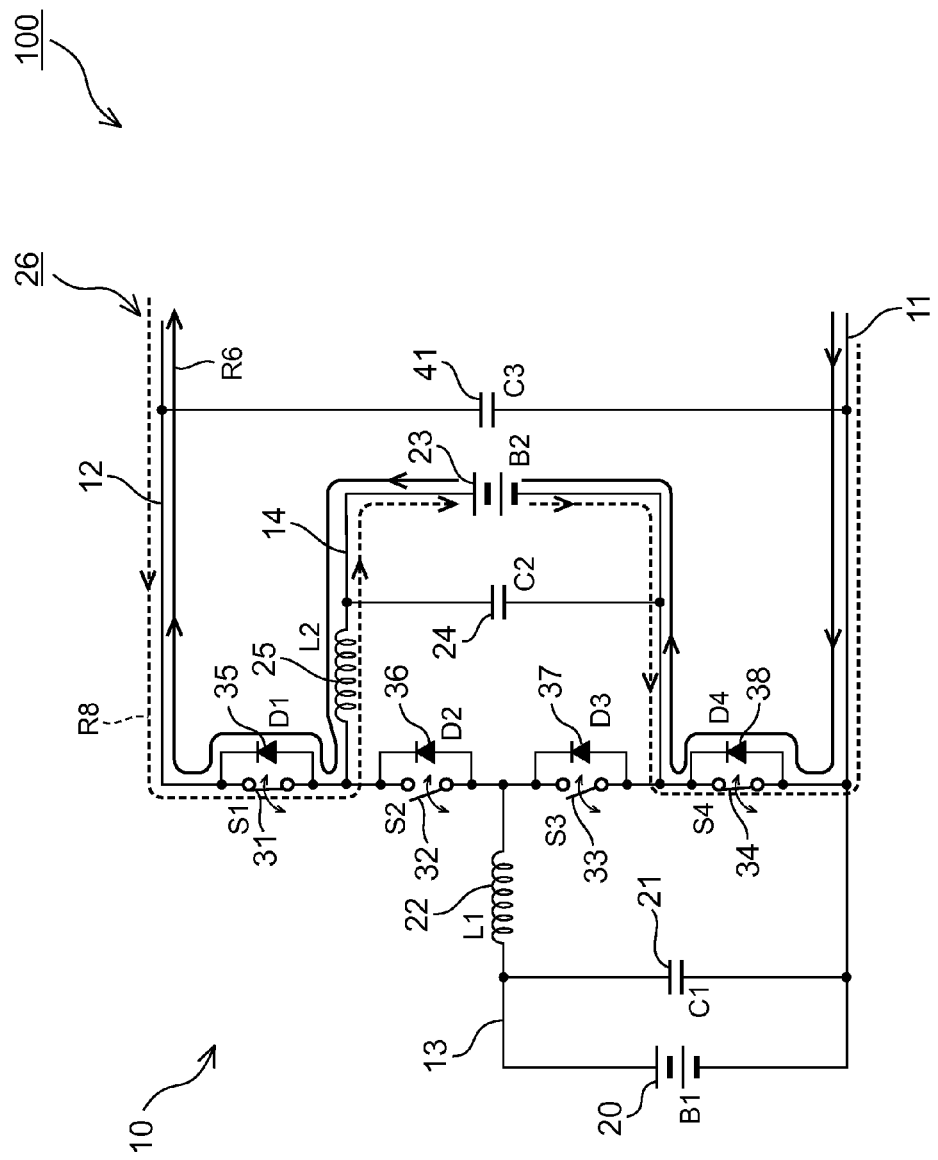
FIG. 5 is a view that illustrates the flow of current at the time when electric power charged in the second reactor is output to the output power line in the basic operations of the power supply system according to the invention.

Next, second voltage conversion between the B2(23) and the output power line 26 will be described with reference to FIG. 4 and FIG. 5. As shown in FIG. 4, a circuit R2 through which current flows in order of the B2(23), the L2(25), the S2(32), the S3(33) and the B2(23) by turning on the pair of S2(32) and S3(33) and turning off the pair of S1(31) and S4(34), and electric power output from the B2(23) returns through the circuit R2 and is charged into the L2(25). Subsequently, as shown in FIG. 5, a circuit R6 (indicated by the continuous line) through which current flows in order of the B2(23), the L2(25), the D1(35), the high-voltage power line 12, the reference power line 11, the D4(38) and the B2(23) and a circuit R8 (indicated by the broken line) through which current flows in order of the high-voltage power line 12, the S1(31), the L2(25), the B2(23), the S4(34), the reference power line 11 and the high-voltage power line 12 are established by turning off the pair of S2(32) and S3(33) and turning on the pair of S1(31) and S4(34), electric power charged in the L2(25) is output to the output power line 26 through the circuit R6, and electric power regenerated by the motor generator 50 is charged into the B2(23) through the circuit R8 (indicated by the broken line). When the pair of S1(31) and S4(34) are turned off during regeneration, electric power charged in the L2(25) is recovered by the B2(23) through a current circuit in the direction reverse to the circuit R2. The voltage VB2 of the B2(23) is stepped up and output to the output power line 26 by alternately repeating a second on period and a second off period. During the second on period, the pair of S2(32) and S3(33) are turned on, while at least one of the S1(31) or the S4(34) is turned off. During the second off period, the S1(31) and the S4(34) are turned on, while at least one of the S2(32) or the S3(33) is turned off.

In this way, in the voltage converter 10, a bidirectional step-up chopper circuit is established. In the bidirectional step-up chopper circuit, the pair of S2(32) and S3(33) are switching elements (second equivalent lower arm elements) that are turned on at the time when the L2(25) is charged by the B2(23), and the pair of S1(31) and S4(34) are switching elements (second equivalent upper arm elements) that are turned on at the time when electric power is output. The step-up chopper circuit includes the circuit R2 described with reference to FIG. 4 and the circuits R6, R8 described with reference to FIG. 5, and is a second voltage conversion circuit. The second voltage conversion circuit is established between the B2(23) and the output power line 26, and carries out second voltage conversion between the B2(23) and the output power line 26.

The total period of the second on period and the second off period in the second voltage conversion circuit is a duty cycle period. The ratio of the second on period to the duty cycle period is a second duty ratio D2. In the second voltage conversion circuit, at the time when the voltage VB2 of the B2(23) is stepped up to the high-voltage command value VH*, the pair of S1(31) and S4(34) (the second equivalent upper arm elements) and the pair of S2(32) and S3(33) (the second equivalent lower arm elements) are subjected to pulse width modulation control (PWM control) such that the relationship among the second duty ratio D2, the high-voltage command value VH* and the voltage VB2 of the B2(23) is expressed by the following mathematical expression (3).

$$VH^* = [1/(1-D2)] \times VB2 \tag{3}$$

In actual control, the pair of S1(31) and S4(34) (the second equivalent upper arm elements) and the pair of S2(32) and S3(33) (the second equivalent lower arm elements) are subjected to PWM control such that VL2 that is the voltage between both ends of the C2(24) is used instead of VB2 and the relationship is expressed by the following mathematical expression (4).

$$VH^* = [1/(1-D2)] \times VL2 \tag{4}$$

A control signal for this PWM control is termed second pulse width modulation control signal.

Generation of Pulse Width Modulation Control Signals and Switching Element Control Signals and Basic Operation of Voltage Converter Next, generation of the first pulse width modulation control signal (PWM1) and the second pulse width modulation control signal (PWM2) and a method of generating switching element control signals SS1 to SS4 from the pulse width modulation control signals (PWM1, PWM2) will be described with reference to (a) to (j) in FIG. 6. The switching element control signals SS1 to SS4 are respectively used to turn on or off the switching elements S1(31) to S4(34).

Figure 6:
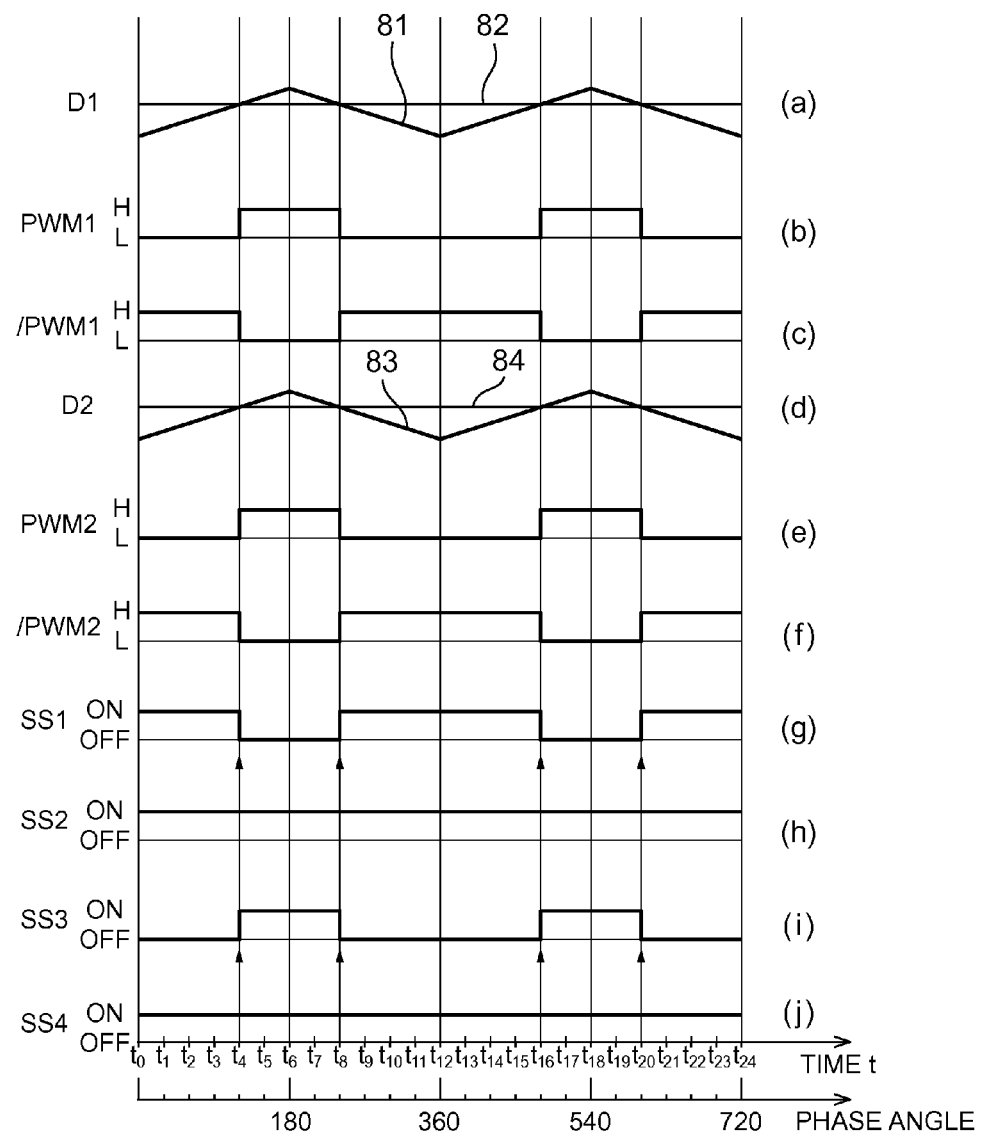
FIG. 6 is a time chart that shows pulse width modulation control signals and switching element control signals at the time of the basic operations of the power supply system according to the invention.

As shown in (a) and (d) of FIG. 6, inside the controller 60, a first triangular wave 81 and a second triangular wave 83 are generated. The first triangular wave 81 has a predetermined frequency, and is used to generate the first pulse width modulation control signal (PWM1). The second triangular wave 83 is used to generate the second pulse width modulation control signal (PWM2). In the present embodiment shown in (a) to (j) of FIG. 6, the frequency (period) of the first triangular wave 81 and the frequency (period) of the second triangular wave 83 are the same, and this frequency is termed carrier frequency. The abscissa axes of (a) to (j) in FIG. 6 represent time or the phase angle of each of the triangular waves 81, 83, and one period corresponds to a phase angle of 360 degrees. One period of each of the first and second triangular waves 81, 83 is termed duty cycle period. t0 to t24 shown at the abscissa axes of (a) to (j) in FIG. 6 represent time, and the interval between the times is a time obtained by dividing one period or the duty cycle period into 12 equal sections. The interval between the times (for example, between time t0 and time t1) is termed one section. Therefore, 12 sections correspond to one duty cycle period, and one period of each of the first and second triangular waves 81, 83 corresponds to a phase angle of 360 degrees.

Subsequently, a straight line 82 is set between the crests and valleys of the first triangular wave 81, and a straight line 84 is set between the crests and valleys of the second triangular wave 83. The height (threshold) of the straight line 82 is set such that the ratio of a period (high-level period) during which the value of the first triangular wave 81 is larger than the value of the straight line 82 in the duty cycle period becomes the first duty ratio D1 described above. Similarly, the height (threshold) of the straight line 84 is set such that the ratio of a period (high-level period) during which the value of the second triangular wave 83 is larger than the value of the straight line 84 in the duty cycle period becomes the second duty ratio D2 described above. By setting the triangular waves 81, 83 and the straight lines (thresholds) 82, 84 in this way, the first pulse width modulation control signal (PWM1) in which the ratio of the period during which the signal is at the high level in the duty cycle period becomes the first duty ratio D1 as shown in (b) of FIG. 6 and the second pulse width modulation control signal (PWM2) in which the ratio of the period during which the signal is at the high level in the duty cycle period becomes the second duty ratio D2 as shown in (e) of FIG. 6 are generated.

As shown in (b) of FIG. 6, in PWM1, the duty cycle period includes 12 sections from time t0 to time t12, a first high-level period in which the signal is at the high level includes four sections from time t4 to time t8, a first low-level period in which the signal is at the low level includes eight sections from time t0 to time t4 and from time t8 to time t12, and the first duty ratio D1=4/(4+8)=(4/12) <50%. As shown in (e) of FIG. 6, PWM2 is also similar to PWM1. As shown in (c) of FIG. 6, as for an inversion signal /PWM1 of PWM1, a period during which the signal is at the low level includes four sections from time t4 to time t8, and a period during which the signal is at the high level includes eight sections from time t0 to time t4 and from time t8 to time t12. /PWM2 that is an inversion signal of PWM2 is also similar to /PWM1. That is, in the operations shown in (a) to (j) of FIG. 6, the timings at which PWM1 and PWM2 become the high level or the low level are the same, that is, the phase difference between PWM1 and PWM2 is zero, and the duty ratios D1, D2 are (4/12)<50%.

The switching element control signals SS1 to SS4 for turning on or off S1(31) to S4(34) are expressed by the following logical expression by using the above-described pulse width modulation control signals PWM1, /PWM1, PWM2, /PWM2.

$$SS1: (/PWM1) \text{ or } (/PWM2) \tag{5}$$

$$SS2: (/PWM1) \text{ or } (PWM2) \tag{6}$$

$$SS3: (PWM1) \text{ or } (PWM2) \tag{7}$$

$$SS4: (PWM1) \text{ or } (/PWM2) \tag{8}$$

In the operations shown in (a) to (j) of FIG. 6, as shown in (g) of FIG. 6, SS1 is a signal that, in one period (duty cycle period), turns on the S1(31) during the four sections from time t0 to time t4, turns off the S1(31) during the four sections from time t4 to time t8 and turns on the S1(31) during the four sections from time t8 to time t12 in every duty cycle repeatedly. As shown in (h) of FIG. 6, SS2 is a signal that constantly turns on the S2(32). As shown in (i) of FIG. 6, SS3 is a signal that turns off the S3(33) during the four sections from time t0 to time t4, turns on the S3(33) during the four sections from time t4 to time t8 and turns off the S3(33) during the four sections from time t8 to time t12 in every duty cycle repeatedly. As shown in (j) of FIG. 6, SS4 is a signal that constantly turns on the S4(34). Therefore, between time t4 and time t8 in (a) to (j) of FIG. 6, the S1(31) turns off, the S2(32), the S3(33) and the S4(34) turn on, the circuit R1 shown in FIG. 2 and the circuit R2 shown in FIG. 4 are established at the same time, the L1(22) is charged by the B1(20), and the L2(25) is charged by the B2(23). From time t0 to time t4 and from time t8 to time t12, the S1(31), the S2(32) and the S4(34) turn on, the S3(33) turns off, the circuits R5, R7 shown in FIG. 3 and the circuits R6, R8 shown in FIG. 5 are established at the same time, electric power charged in the L1(22) and electric power charged in the L2(25) are output to the output power line 26 at the same time.

In the operations shown in (a) to (j) of FIG. 6, as indicated by the black triangle marks in (g) and (i) of FIG. 6, the number of switching operations of each of the S1(31) and the S3(33) from the on state to the off state or from the off state to the on state is two during one period (a phase angle of 360 degrees) of each of the first and second triangular waves 81, 83 or one duty cycle period (from time t0 to time t12). The timings of switching operations are the same. Therefore, in the voltage converter 10, because components, such as the C1(21), the L1(22), the C2(24), the L2(25) and a bus bar, receive changes in Lorentz force and electrostatic force once at time t4 and once at time t8, twice in total, during one period (a phase angle of 360 degrees) of each of the first and second triangular waves 81, 83 or one duty cycle period (from time t0 to time t12) and, as a result, a vibration occurs in these components twice during one duty cycle period (from time t0 to time t12), a vibration or noise having a frequency that is twice as high as the frequency (carrier frequency) of each of the first and second triangular waves 81, 83 occurs. When the frequency (carrier frequency) of each of the first and second triangular waves 81, 83 is 10 kHz, the frequency of generated electromagnetic sound is 20 kHz and is a frequency close to the upper limit of the human audible range, so it may be felt as noise.

<Changing Phases of PWM 1 and PWM2>

Next, operations and generated noise at the time when the phases of the first and second pulse width modulation control signals PWM1, PWM2 are changed from the operations for the zero phase difference, shown in (a) to (j) in FIG. 6 to operations at a phase difference of 180 degrees (a half of the duty cycle period (time t0 to time t12)) will be described with reference to (a) to (j) of FIG. 7.

Figure 7:
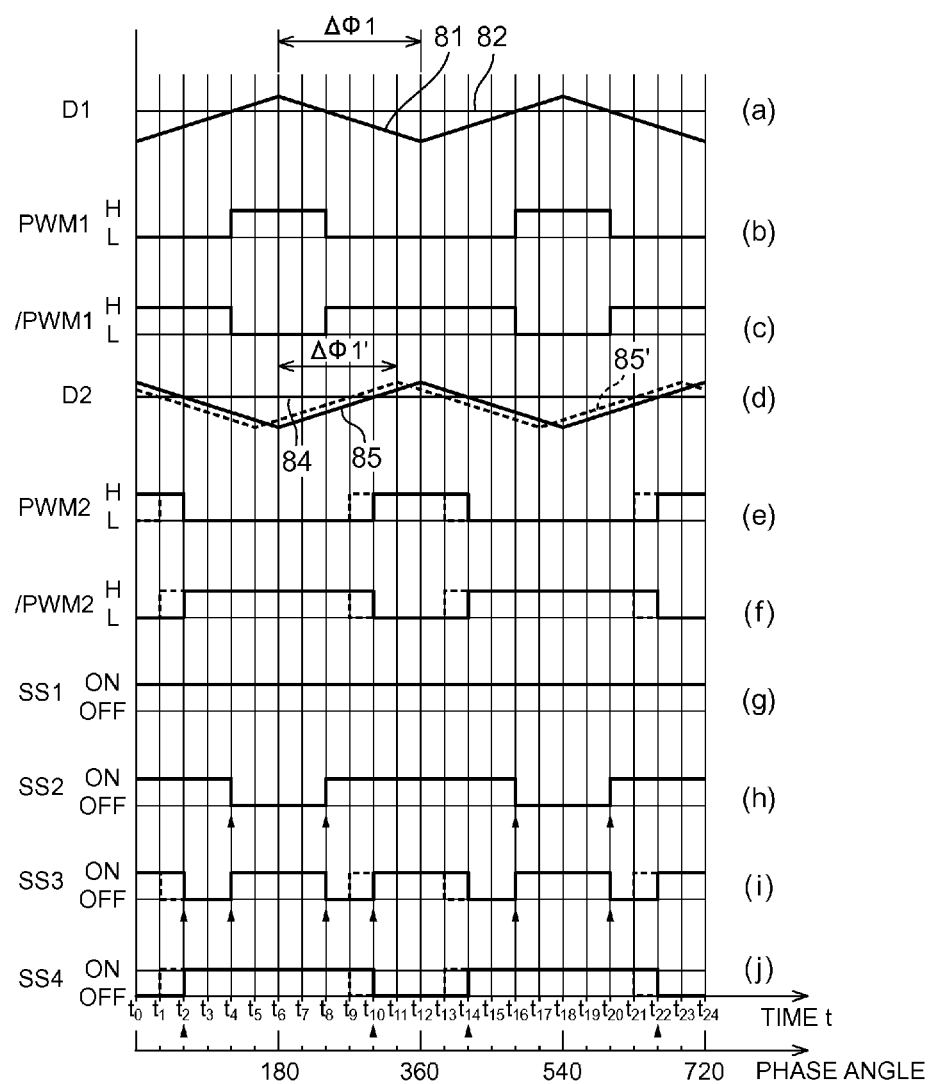
FIG. 7 is a time chart that shows the pulse width modulation control signals and the switching element control signals at the time when the phase of PWM2 is shifted by 180 degrees or 150 degrees from the phase of PWM1 in the power supply system according to the invention.

As shown in (a) and (d) of FIG. 7, the second triangular wave for generating PWM2 is set to a second triangular wave 85 in which a phase difference Δφ1 to the phase of the first triangular wave 81 for generating PWM1 is 180 degrees. More specifically, the second triangular wave 83 shown in (d) of FIG. 6 is shifted by six sections in time such that the peaks of the crests of the second triangular wave 85 shown in (d) of FIG. 7 are set at time t12 and time t24, with the result that a time difference from the peaks of the crests of the first triangular wave 81 is six sections (t12-t6), (t24-t18). Thus, as shown in (b) and (e) of FIG. 7, the phase of PWM2 is shifted by 180 degrees, that is, six sections or a half of 12 sections of the duty cycle period in time, from the phase of PWM1. Similarly, the phase of /PWM2 is shifted by 180 degrees, that is, six sections or a half of 12 sections of the duty cycle period in time, from the phase of /PWM1. The first duty ratio D1 of PWM1 and the second duty ratio D2 of PWM2 each are (4/12)<50% as in the case of the operations described with reference to (a) to (j) of FIG. 6. As shown in (b) and (e) of FIG. 7, the first high-level period during which PWM1 is at the high level is from time t4 to time t8; whereas the second high-level period during which PWM2 is at the high level is from time t0 to time t2 and from time t10 to time t12. Therefore, the first high-level period of PWM1 and the second high-level period of PWM2 do not overlap with each other, and both PWM1 and PWM2 are at the low level from time t2 to time t4 and from time t8 to time t10. In this way, when the total period (eight sections) of the first high-level period of PWM1 (four sections) and the second high-level period of PWM2 (four sections) is shorter than the duty cycle period (12 sections), in other words, when the total numeric value (33+33=66) of the numeric value (4/12=1/3=33%, and the numeric value is 33) of the first duty ratio D1 of PWM1 in percentage and the numeric value (4/12=1/3=33%, and the numeric value is 33) of the second duty ratio D2 of PWM2 in percentage is smaller than the numeric value (12/12=100%, and the numeric value is 100) of the duty cycle period in percentage, and when the phase of PWM2 is shifted by 180 degrees, that is, six sections or a half of 12 sections of the duty cycle period, from the phase of PWM1, the first high-level period of PWM1 and the second high-level period of PWM2 do not overlap with each other. That is, the phases of PWM1 and PWM2 are controlled such that the respective high-level periods alternately appear in every half period of the duty cycle period.

Figure 8:
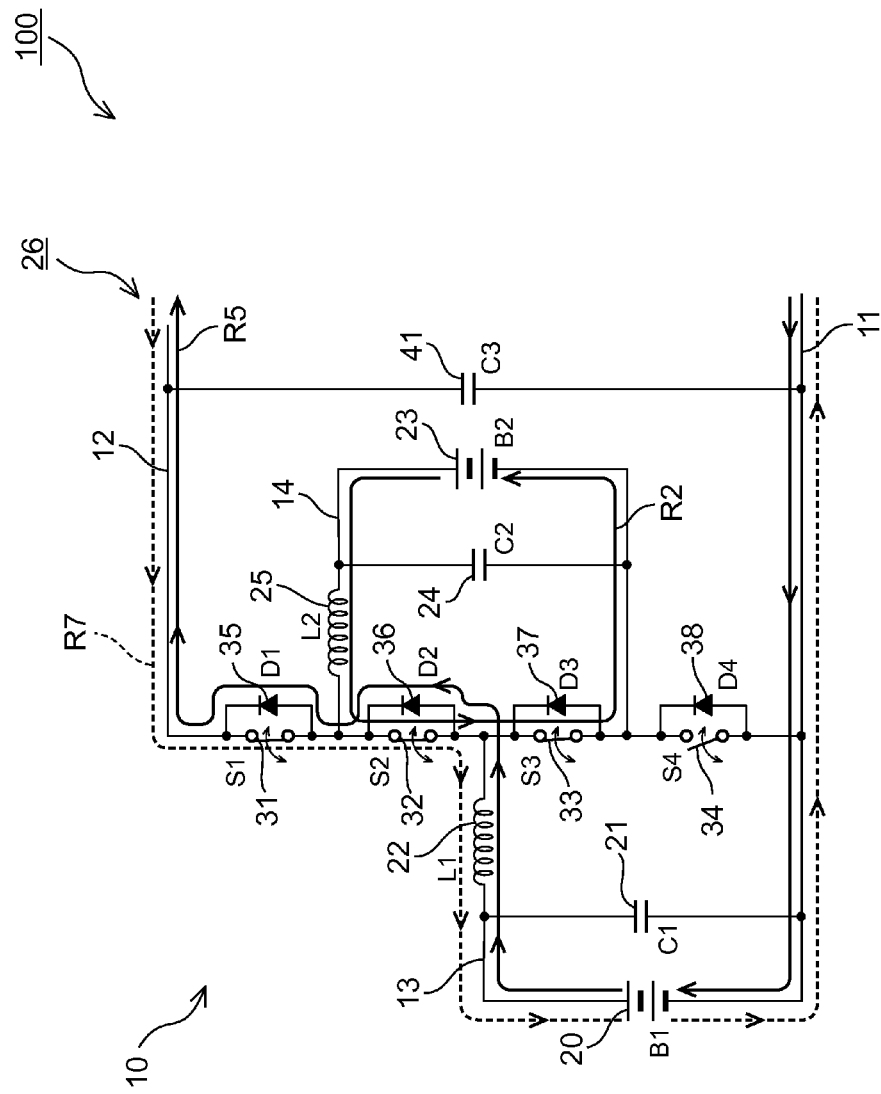
FIG. 8 is a view that illustrates the flow of current at the time when the second reactor is charged and electric power is output from the first battery in the operation shown in FIG. 7.
Figure 9:
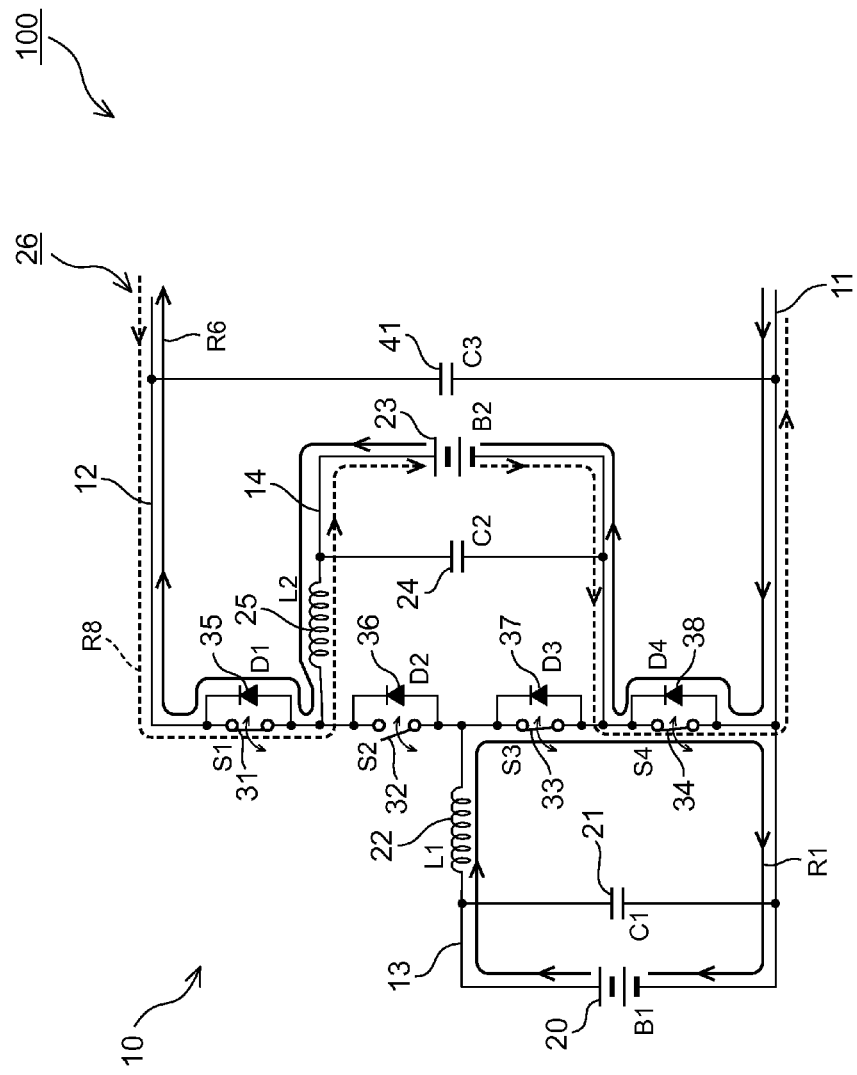
FIG. 9 is a view that illustrates the flow of current at the time when the first reactor is charged and electric power is output from the second battery in the operation shown in FIG. 7.

The control signals SS1 to SS4 for turning on or off the S1(31) to the S4(34) at this time are calculated from the above-described mathematical expressions (5) to (8), and are shown in (g) to (j) of FIG. 7. As shown in (g) of FIG. 7, SS1 is a signal that constantly turns on the S1(31). As shown in (h) of FIG. 7, SS2 is a signal that, within one period (duty cycle period), turns on the S2(32) during the four sections from time t0 to time t4, turns off the S2(32) during the four sections from time t4 to time t8, and turns off the S2(32) during the four sections from time t8 to time t12 in every duty cycle repeatedly. As shown in (i) of FIG. 7, SS3 is a signal that turns on the S3(33) during the two sections from time t0 to time t2, turns off the S3(33) from time t2 to time t4, turns on the S3(33) from time t4 to time t8, turns off the S3(33) from time t8 to time t10, and turns on the S3(33) from time t10 to time t12 in every duty cycle repeatedly. As shown in (j) of FIG. 7, SS4 is a signal that turns off the S4(34) from time t0 to time t2, turns on the S4(34) from time t2 to time t10, and turns off the S4(34) from time t10 to time t12 in every duty cycle repeatedly. Therefore, from time t0 to time t2 and from time t10 to time t12 in (a) to (j) of FIG. 7, the S1(31) to the S3(33) turn on, the S4(34) turns off, the circuits R5, R7, R2 are established at the same time as shown in FIG. 8, electric power charged in the L1(22) by the B1(20) is output through the circuit R5 to the output power line 26, and the L2(25) is charged by the B2(23). From time t2 to time t4 and from time t8 to time t10, the S1(31), the S2(32) and the S4(34) turn on and the S3(33) turns off, the circuits R5, R7 shown in FIG. 3 and the circuits R6, R8 shown in FIG. 5 are established at the same time, electric power charged in the L1(22) and electric power charged in the L2(25) are output to the output power line 26 at the same time. From time t4 to time t8, the S1(31), the S3(33) and the S4(34) turn on and the S2(32) turns off, the circuit R1 and the circuits R6, R8 are established at the same time as shown in FIG. 9, electric power charged into the L2(25) by the B2(23) is output through the circuit R6 to the output power line 26, and the L1(22) is charged by the B1(20).

In the operations shown in (a) to (j) of FIG. 7, as indicated by the black triangle marks in (h) to (j) of FIG. 7, during one period (a phase angle of 360 degrees) of each of the first and second triangular waves 81, 85 or during one duty cycle period (from time t0 to time t12), the S2(32) switches from the on state to the off state or switches from the off state to the on state at time t4 and time t8, the S3(33) switches from the on state to the off state or switches from the off state to the on state at time t2, time t4, time t8, and time t10, and the S4(34) switches from the on state to the off state or switches from the off state to the on state at time t2 and time t10. Therefore, in the operations, in the voltage converter 10, a vibration arises four times at time t2, time t4, time t8 and time t10 during one duty cycle period (from time t0 to time t12), with the result that a vibration or noise having a frequency that is four times as high as the frequency (carrier frequency) of each of the first and second triangular waves 81, 85 arises. When the frequency (carrier frequency) of each of the first and second triangular waves 81, 83 is 10 kHz, the frequency of generated electromagnetic sound is 40 kHz and is a frequency higher than the upper limit of the human audible range, so it is not felt by a human as noise. In this way, when the phase difference $\Delta\phi1$ of the phase of the second triangular wave 85 for generating PWM2 with respect to the phase of the first triangular wave 81 for generating PWM1 is set to 180 degrees in the case where each of the duty ratios D1, D2 of PWM1 and PWM2 is lower than or equal to 50%, the frequency of electromagnetic sound that is generated by the voltage converter 10 is four times as high as the frequency (carrier frequency) of each of the first and second triangular waves 81, 85, and the frequency of generated electromagnetic sound is brought to the outside of the human audible range, so it is possible to reduce noise generated by the voltage converter 10. That is, by changing the phase of PWM2 with respect to the phase of PWM1, a similar advantageous effect of noise reduction to that in the case where the carrier frequency is doubled.

In the above description, the description is made on the assumption that the phase difference of the second triangular wave 85 for generating PWM2 with respect to the first triangular wave 81 is set to 180 degrees. However, as long as a phase difference does not cause the first high-level period of PWM1 and the second high-level period of PWM2 to overlap with each other, the phase of the first triangular wave 81 and the phase of the second triangular wave may be shifted from each other such that the phase difference is other than 180 degrees. For example, as shown in (d) of FIG. 7, a second triangular wave 85' may be set such that the phase of the second triangular wave for generating PWM2 is shifted by a phase difference $\Delta\phi1'$ (150 degrees), that is, five sections in time, from the phase of the first triangular wave 81 for generating PWM1. Thus, as shown in (e) and (f) of FIG. 7, the phases of PWM2 and /PWM2 are respectively shifted by 150 degrees (five sections in time) from the phases of PWM1 and /PWM1. The switching element control signals SS1, SS2 for turning on or off the S1(31) and the S2(32) at this time are the same as those in the case of the second triangular wave 85 as indicated by the broken lines in (g) and (h) of FIG. 7, the switching element control signal SS3 for turning on or off the S3(33), which switches from the on state to the off state or switches from the off state to the on state at time t2 and time t10 in the case of the second triangular wave 85, switches from the on state to the off state or switches from the off state to the on state at time t1 and time t9, a vibration arises four times at time t1, time t4, time t8, time t9 in one duty cycle period (from time t0 to time t12), and, as in the case of the second triangular wave 85, a vibration or noise having a frequency that is four times as high as the frequency (carrier frequency) of each of the first and second triangular waves 81, 85' arises. Therefore, in this case as well, as in the case of the second triangular wave 85, it is possible to reduce noise by bringing the frequency of electromagnetic sound generated by the voltage converter 10 to the outside of the human audible range.

In the above-described operations described with reference to (a) to (j) of FIG. 7, the description is made on the assumption that the first duty ratio D1 of PWM1 and the second duty ratio D2 of PWM2 each are (4/12)<50%. However, as long as the total period (eight sections) of the first high-level period (four sections) of PWM1 and the second high-level period (four sections) of PWM2 is shorter than the duty cycle period (12 sections), it is possible to adjust the phases of PWM1 and PWM2 such that the first high-level period of PWM1 and the second high-level period of PWM2 do not overlap with each other. In other words, when the total numeric value of the numeric value of the first duty ratio D1 of PWM 1 in percentage and the numeric value of the second duty ratio D2 of PWM2 in percentage is smaller than 100 that is the numeric value of the duty cycle period in percentage, it is possible to adjust the phases of PWM1 and PWM2 such that the phase of the first high-level period of the PWM1 and the phase of the second high-level period of PWM2 do not overlap with each other.

Figure 10:
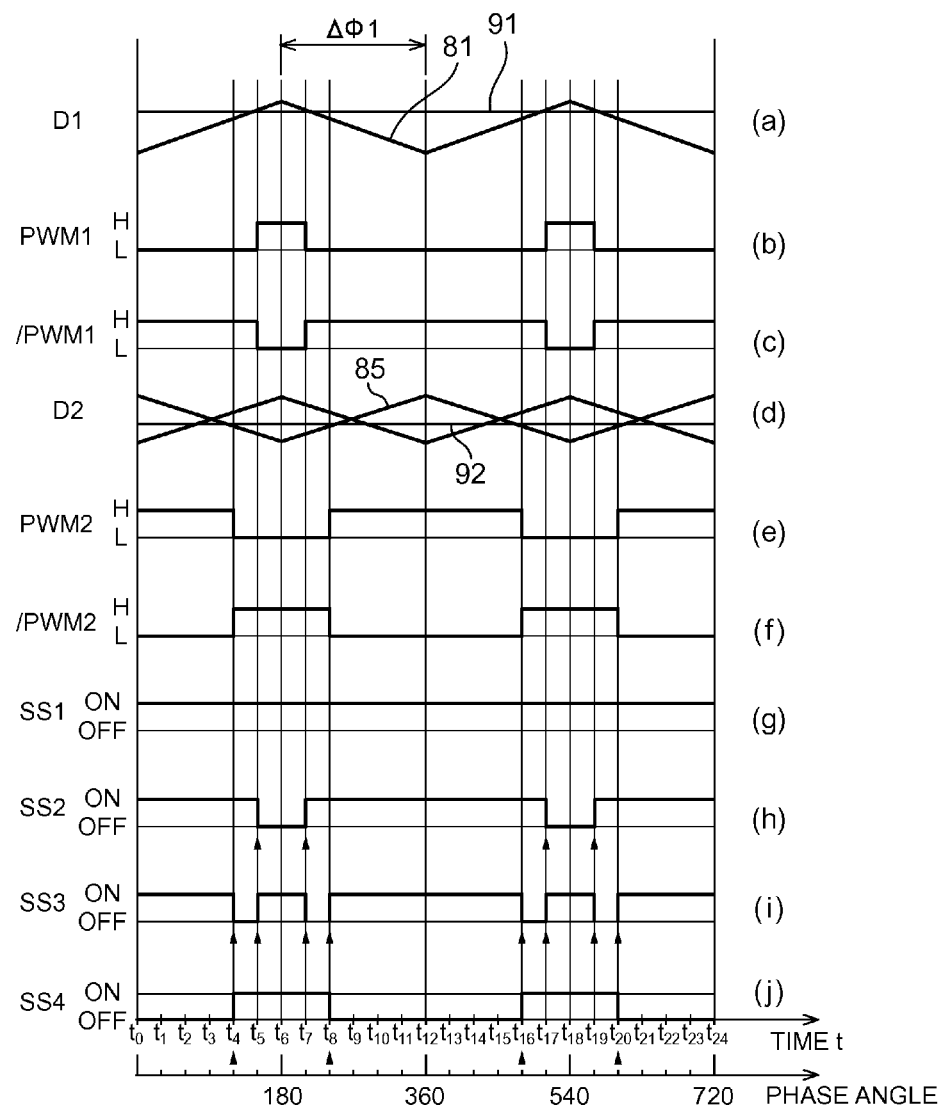
FIG. 10 is a time chart that shows the timings of the pulse width modulation control signals and switching element control signals at the time when the phase of PWM2 is shifted by 180 degrees from the phase of PWM1 in the case where the duty ratio of PWM2 is higher than or equal to 50% and the total period of a first high-level period of PWM1 and a second high-level period of PWM2 is shorter than a duty cycle period in the power supply system according to the invention.

For example, as shown in (a) of FIG. 10, when the height (threshold) of a straight line 91 that sets the first duty ratio D1 is raised beyond the straight line 82 in (a) of FIG. 7 (the threshold is increased), the duty cycle period is set to 12 sections from time t0 to time t12, the first high-level period of PWM1 includes two sections from time t5 to time t7 and a first low level period of PWM1 includes 10 sections from time t0 to time t5 and from time t7 to time t12, the first duty ratio D1=2/(2+10)=(2/12)<50%, the height (threshold) of a straight line 92 that sets the second duty ratio D2 is lowered below the straight line 84 in (d) of FIG. 7 (the threshold is reduced), the second high-level period of PWM2 includes eight sections from time t0 to time t4 and from time t8 to time t12 and a second low-level period of PWM2 includes four sections from time t4 to time t8, and the second duty ratio D2=8/(4+8)=(8/12)>50%, the total period of the first high-level period of PWM1 and the second high-level period of PWM2 is the sum of the two sections and the eight sections, which equals to 10 sections, and is shorter than 12 sections of the duty cycle period. In this case, as described with reference to (a) to (j) of FIG. 7, when the second triangular wave 85 of which the phase difference to the first triangular wave 81 is 180 degrees is used, as indicated by the black triangle marks in (h) to (j) of FIG. 10, during one period (a phase angle of 360 degrees) of each of the first and second triangular waves 81, 85 or one duty cycle period (from time t0 to time t12) the S2(32) switches from the on state to the off state or switches from the off state to the on state at time t5 and time t7, the S3(33) switches from the on state to the off state or switches from the off state to the on state at time t4, time t5, time t7, and time t8, and the S4(34) switches from the on state to the off state or switches from the off state to the on state at time t4 and time t8. Therefore, in the operations, in the voltage converter 10, a vibration arises four times at time t4, time t5, time t7 and time t8 during one duty cycle period (from time t0 to time t12), with the result that a vibration or noise having a frequency that is four times as high as the frequency (carrier frequency) of each of the first and second triangular waves 81, 85 arises. In this way, when any one of the duty ratio D1 of PWM1 or the duty ratio D2 of PWM2 is higher than or equal to 50%, but when the total period of the first high-level period of PWM1 and the second high-level period of PWM2 is shorter than the duty cycle period, by adjusting the phase of PWM2 with respect to the phase of PWM1 such that the first high-level period of PWM1 and the second high-level period of PWM2 do not overlap with each other, it is possible to reduce noise by bringing the frequency of electromagnetic sound of the voltage converter 10 beyond the human audible range. In the above description, the description is made on the assumption that the phase difference between PWM1 and PWM2 is set to 180 degrees; however, the phase difference is not limited to 180 degrees as long as it is possible to adjust the phases such that the first high-level period of PWM1 and the second high-level period of PWM2 do not overlap with each other.

Mixing of Overlapping Control with Non-Overlapping Control for First and Second Pulse Width Modulation Control Signal In the above-described embodiment, the description is made on the assumption that the phases of PWM1 and PWM2 are set such that the phase of the first high-level period of PWM1 and the phase of the second high-level period of PWM2 do not overlap with each other. However, as shown in (a) to (j) of FIG. 11, phase control may be executed by mixing first control with second control. In the first control, the phases of the pulse width modulation control signals are controlled such that the first high-level period of the first pulse width modulation control signal (PWM1) and the second high-level period of the second pulse width modulation control signal (PWM2) overlap with each other or partially overlap with each other. In the second control, the phases of the pulse width modulation control signals are controlled such that the first high-level period of PWM1 and the second high-level period of PWM2 do not overlap with each other. In the following description, the case where the first control and the second control are mixed with each other by changing the phase of PWM2 with respect to the phase of PWM1 in accordance with a schedule will be described. Similar operations to those described with reference to (a) of FIG. 7 to (j) of FIG. 10 will be simply described.

Figure 11:
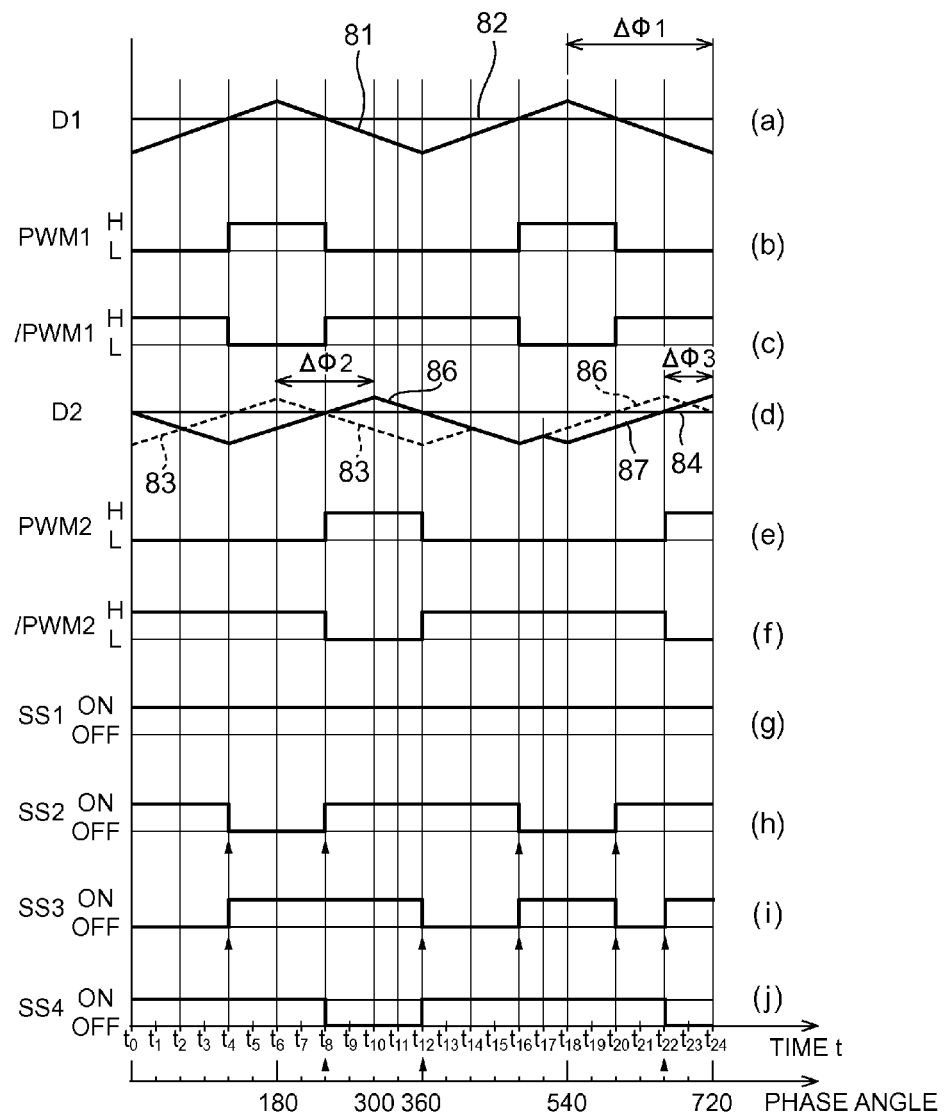
FIG. 11 is a time chart that shows the pulse width modulation control signals and the switching element control signals at the time when the phase of the second pulse width modulation control signal is changed in accordance with a schedule in the power supply system according to the invention.

The first triangular wave 81 and the straight line 82 (threshold) shown in (a) of FIG. 11 are similar to those in (a) of FIG. 6, and PWM1 and /PWM1 shown in (b) and (c) of FIG. 11 are similar to PWM1 and /PWM1 described with reference to (b) and (c) of FIG. 6. As shown in (d) of FIG. 11, a second triangular wave for generating PWM2 is the second triangular wave 83 of which the phase difference to the first triangular wave 81 is zero from time t0 to time t2, and PWM1, /PWM1, PWM2, /PWM2, and SS1 to SS4 during then have similar signal waves to those in (a) to (j) of FIG. 6.

At time t2, the controller 60 switches the phase of the second triangular wave from the phase of the initial second triangular wave 83 or first triangular wave 81 to a second triangular wave 86 shifted by Δϕ2(120 degrees). Then, the second triangular wave 86 begins from time t2 in (d) of FIG. 11. The second triangular wave 86 becomes a valley at time t4, then becomes a crest at time t10, becomes a valley at time t16, and continues to time t17. As shown in (d) of FIG. 11, the second triangular wave 86 and the straight line 84 (threshold) that defines the second duty ratio D2 of PWM2 cross with each other at time t8 and time t12, and the value of the second triangular wave 86 is higher than the value of the straight line 84 from time t8 to time t12. Thus, PWM2 is at the high level from time t8 to time t12, and PWM2 is at the low level during the other sections. /PWM2 is at the low level from time t8 to time t12, and is at the high level during the other sections. In this way, PWM1 and PWM2 overlap with each other at time t8, PWM1 and PWM2 do not overlap with each other during the other periods, /PWM1 and /PWM2 overlaps with each other at time t8, and /PWM1 and /PWM2 do not overlap with each other during the other periods (first control).

From time t2 to time t17 in which the second triangular wave 86 continues, the control signals SS1 to SS4 for respectively turning on or off the S1(31) to the S4(34) are calculated by the above-described mathematical expressions (5) to (8), and are as shown in (g) to (j) of FIG. 11. As shown in (g) of FIG. 11, SS1 is a signal that constantly turns on the S1(31). As shown in (h) of FIG. 11, SS2 is a signal that turns on the S2(32) from time t2 to time t4, turns off the S2(32) from time t4 to time t8, turns on the S2(32) from time t8 to time t16, and turns off the S2(32) from time t16 to time t17. As shown in (i) of FIG. 11, SS3 is a signal that turns off the S3(33) from time t2 to time t4, turns on the S3(33) from time t4 to time t12, turns off the S3(33) from time t12 to time t16, and turns on the S3(33) from time t16 to time t17. In addition, as shown in (j) of FIG. 11, SS4 is a signal that turns on the S4(34) from time t2 to time t8, turns off the S4(34) from time t8 to time t12, and turns on the S4(34) from time t12 to time t17.

At time t17, the controller 60 switches to a second triangular wave 87 of which the phase of the second triangular wave is further shifted by Δϕ3 (60 degrees). The second triangular wave 87 becomes a valley at time t18 and then becomes a crest at time t24. The phase difference of the second triangular wave 87 with respect to the initial second triangular wave 83 or first triangular wave 81 is Δϕ1 (180 degrees). Therefore, as in the case of the operations described with reference to (a) to (j) of FIG. 7, PWM1 and PWM2 do not overlap with each other at all and /PWM1 and /PWM2 do not overlap with each other at all (second control).

From time t17 to time t24 in which the second triangular wave 87 continues, the control signals SS1 to SS4 for turning on or off the S1(31) to the S4(34) are calculated by the above-described mathematical expressions (5) to (8). As shown in (g) of FIG. 11, SS1 is a signal that constantly turns on the S1(31). As shown in (h) of FIG. 11, SS2 is a signal that turns off the S2(32) from time t17 to time t20, and turns on the S2(32) from time t20 to time t24. As shown in (i) of FIG. 11, SS3 turns on the S3(33) from time t17 to time t20, turns off the S3(33) from time t20 to time t22, and turns on the S3(33) from time t22 to time t24. In addition, as shown in (j) of FIG. 11, SS4 is a signal that turns on the S4(34) from time t17 to time t22, and turns off the S4(34) from time t22 to time t24.

Because SS1 to SS4 are signals as described above from t0 to time t24, during the initial period of the first triangular wave 81 from time t0 to time t12, the S2(32) switches from the on state to the off state or switches from the off state to the on state at time t4 and time t8, the S3(33) switches from the on state to the off state or switches from the off state to the on state at time t4 and time t12, and the S4(34) switches from the on state to the off state or switches from the off state to the on state at time t8 and time t12. Therefore, as indicated by the black triangle marks in (h) and (j) of FIG. 11, in the voltage converter 10, a vibration arises three times at time t4, time t8 and time t12 during the initial period (from time t0 to time t12) of the first triangular wave 81, and a vibration or electromagnetic noise having a frequency that is three times as high as the frequency (carrier frequency) of the first triangular wave 81 arises. During the next period of the first triangular wave 81 from time t12 to time t24, the S2(32) switches from the on state to the off state or switches from the off state to the on state at time t16 and time t20, the S3(33) switches from the on state to the off stat or switches from the off state to the on state at time t16, time t20 and time t22, and the S4(34) switches from the on state to the off state at time t22. Therefore, in the voltage converter 10, a vibration arises three times at time t16, time t20 and time t22 during the next period (from time t12 to time t24) of the first triangular wave 81, and a vibration or electromagnetic noise having a frequency that is three times as high as the frequency (carrier frequency) of the first triangular wave 81 arises.

The second triangular wave 87 still continues during the next period (from time t24 to time t36) of the first triangular wave 81 after time t24. Because the second triangular wave 87 is shifted in phase by 180 degrees from the first triangular wave 81, PWM 1 and PWM2 do not overlap with each other at all and /PWM 1 and /PWM2 do not overlap with each other at all from time t24 to time t36 (second control). PWM2 and /PWM2 from time t24 to time t36 have similar waveforms to those from time t0 to time t12 in (d) of FIG. 7, so SS1 to SS4 during the next period (from time t24 to time t36) of the first triangular wave 81 after time t24 have similar waveforms to those of the waveforms indicated by the continuous lines in (g) to (j) of FIG. 7. Therefore, as described with reference to (g) to (j) of FIG. 7, in the voltage converter 10, a vibration arises four times during the next period (from time t24 to time t36) of the first triangular wave 81, and a vibration or electromagnetic noise having a frequency that is four times as high as the frequency (carrier frequency) of the first triangular wave 81 arises.

In this way, the controller 60 changes the phase difference of the second triangular wave to the first triangular wave 81 or the phase difference of PWM2 to PWM1 in order of zero (before time t2, first control), 120 degrees (from time t2 to time t17, first control) and 180 degrees (from time t17, second control) in every period of the first triangular wave 81 in accordance with a predetermined schedule. Thus, PWM1 and PWM2 change in order of (1) the state where PWM 1 and PWM2 overlap with each other (first control), (2) the state where PWM1 and PWM2 partially overlap with each other (first control) and (3) the state where PWM1 and PWM2 do not overlap with each other at all (second control).

When the phase difference is zero, the basic operations described with reference to (a) to (j) of FIG. 6 are carried out, and, in the voltage converter 10, a vibration arises twice during one period of the first triangular wave 81. During the initial period of the first triangular wave, in which the phase difference is changed to 120 degrees, as described above, a vibration arises three times during one period of the first triangular wave 81. During the next period in which the phase difference is changed to 180 degrees as well, a vibration arises three times during one period of the first triangular wave 81. During the next period of the first triangular wave 81, in which the phase difference is kept at 180 degrees, a vibration arises four times during one period of the first triangular wave 81. Therefore, by changing the phase difference of the second triangular wave with respect to the first triangular wave 81 in order of zero, 120 degrees, 180 degrees and 180 degrees in every period of the first triangular wave 81, the frequency of electromagnetic sound that is generated from the voltage converter 10 changes in order of twice, three times, three times and four times as high as the frequency of the first triangular wave 81. That is, by changing the phase difference of PWM2 with respect to PWM1 in order of zero, 120 degrees, 180 degrees and 180 degrees in every period of PWM1, the frequency of electromagnetic sound that is generated from the voltage converter 10 changes in order of twice, three times, three times and four times as high as the frequency of PWM1. When the frequency (carrier frequency) of the first triangular wave 81 is 10 kHz, the frequency of electromagnetic sound that is generated from the voltage converter 10 changes in order of 20 kHz, 30 kHz, 30 kHz and 40 kHz. Thus, the frequency band of noise is averaged in a wide range, and it is possible to reduce the average level of electromagnetic sound near 20 kHz that falls within the human audible range, so it is possible to suppress noise of the voltage converter 10. The operations are able to reduce the average number of on/off operations of each of the S2(32) to the S4(34) as compared to the case where the phase difference of the second triangular wave 85 with respect to the first triangular wave 81 is set to 180 degrees like the operations described with reference to (a) to (j) of FIG. 7, so it is possible to suppress an increase in switching loss and reduce noise as compared to the operations described with reference to (a) to (j) of FIG. 7, that is, the operations are the operations that balance an increase in switching loss with a reduction in noise.

In the above description, the controller 60 changes the phase difference of the second triangular wave with respect to the first triangular wave 81 or the phase difference of PWM2 with respect to PWM1 in order of zero (first control), 120 degrees (first control), 180 degrees (second control) and 180 degrees (second control) in every period of the first triangular wave 81 in accordance with a predetermined schedule, and changes PWM1 and PWM2 in order of (1) the state where PWM1 and PWM2 overlap with each other (first control), (2) the state where PWM1 and PWM2 partially overlap with each other (first control), and (3) the state where PWM1 and PWM2 do not overlap with each other at all (second control), thus suppressing an increase in switching loss and reducing noise. However, as long as it is possible to reduce the average number of on/off operations of each of the S2(32) to the S4(34) as compared to when the phase difference of the second triangular wave 85 with respect to the first triangular wave 81 is set to 180 degrees, a schedule for changing the phases in every period of the first triangular wave 81 is not limited to the above-described example. For example, zero (first control) and 180 degrees (second control) may be alternately switched, that is, the state where PWM1 and PWM2 overlap with each other (first control) and the state where PWM1 and PWM2 do not overlap with each other at all (second control) may be alternately switched, like in order of zero (first control), 180 degrees (second control), zero (first control) and 180 degrees (second control). Alternatively, the phases of PWM1 and PWM2 may be changed at random by changing the phase of the first triangular wave 81 in accordance with a schedule that combines zero, 120 degrees, and 180 degrees at random. That is, phase control may be executed by mixing the first control with the second control at random. In the first control, the phases of the pulse width modulation control signals are controlled such that the first high-level period of the first pulse width modulation control signal (PWM1) and the second high-level period of the second pulse width modulation control signal (PWM2) overlap with each other or partially overlap with each other. In the second control, the phases of the pulse width modulation control signals are controlled such that the first high-level period of PWM1 and the second high-level period of PWM2 do not overlap with each other. Thus, the frequency band of noise is averaged in a wide range, and it is possible to reduce the average level of electromagnetic sound near 20 kHz that falls within the human audible range, so it is possible to suppress noise of the voltage converter 10.

Changing PWM2 from Low Level to High Level and then Returning PWM2 to Low Level During Low Level Period of PWM 1

Next, the operations of changing PWM2 from the low level to the high level and then returning PWM2 to the low level (changing /PWM2 from the high level to the low level and then returning /PWM2 to the high level) during a period in which PWM1 is at the low level (during a period in which /PWM1 is at the high level) will be described with reference to (a) to (j) of FIG. 12. Similar operations to the operations described with reference to (a) to (j) of FIG. 6 will be simply described.

Figure 12:
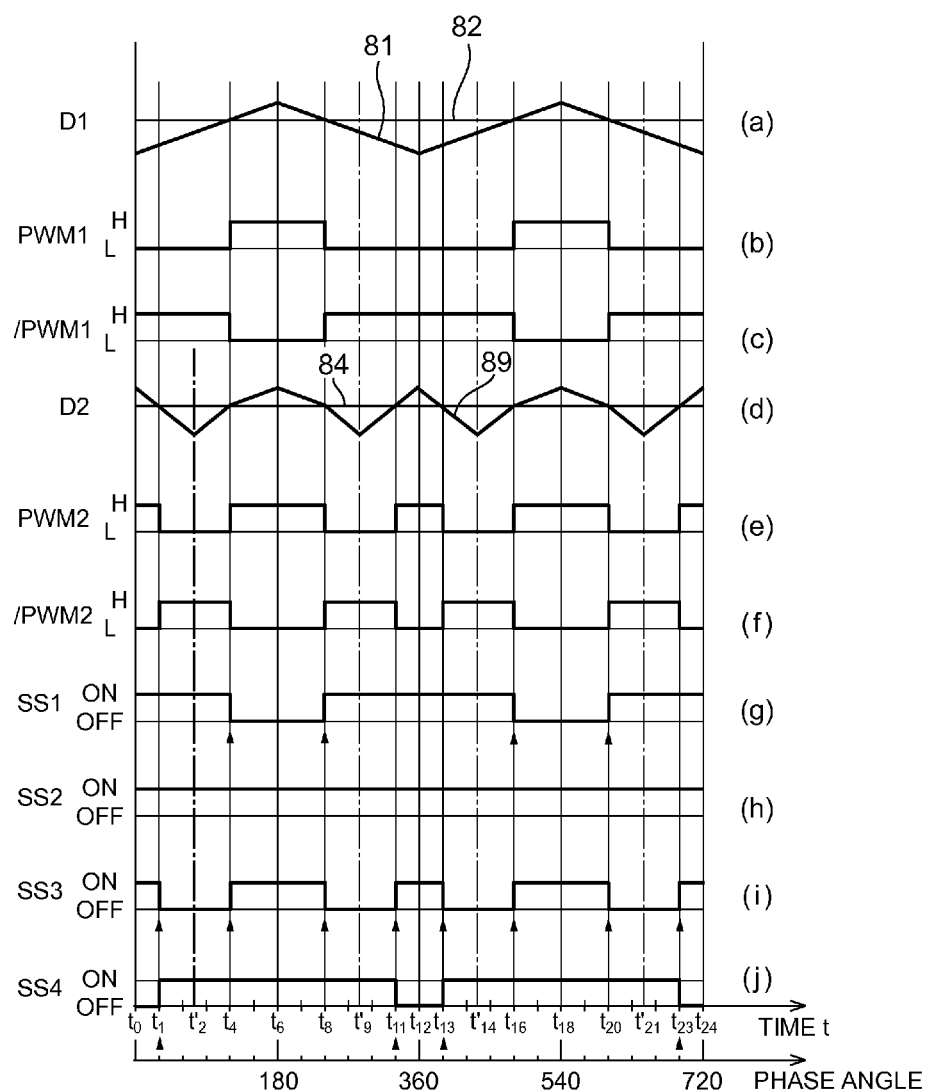
FIG. 12 is a time chart that shows the pulse width modulation control signals and the switching element control signals at the time when the frequency of a second triangular wave is temporarily increased in the power supply system according to the invention.

The first triangular wave 81 and the straight line 82 (threshold) shown in (a) of FIG. 12 are similar to those in (a) of FIG. 6, and PWM1 and /PWM1 shown in (b) and (c) in FIG. 12 are similar to PWM1 and /PWM1 described with reference to (b) and (c) of FIG. 6. As shown in (d) of FIG. 12, a second triangular wave 89 that generates PWM2 from time t4 to time t8 and from time t16 to time t20 is similar to the second triangular wave 83 from time t4 to time t8 and from time t16 to time t20 in (d) of FIG. 6. Therefore, PWM1, /PWM1, PWM2, /PWM2, and SS1 to SS4 during then have similar signal waves to those in (a) to (j) of FIG. 6. The times of the valley positions of the second triangular wave 89 are indicated by the signs t'2, t'9, t'14, t'14, t'21 in FIG. 12.

As shown in (d) of FIG. 12, the controller 60 temporarily raises the frequency of the second triangular wave 89 beyond the frequency of the first triangular wave 81 such that a period during which the value of the second triangular wave 89 exceeds the straight line 84 (threshold) and a period during which the value of the second triangular wave 89 does not exceed the straight line 84 (threshold) both are provided during each of the section from time t0 to time t4 in which PWM1 is at the low level (/PWM1 is at the high level), the section from time t8 to time t16 and the section from time t20 to time t24. Thus, the value of the second triangular wave 89 exceeds the straight line 84 (threshold), PWM2 is at the high level from time t0 to time t1, from time t11 to time t13 and from time t23 to time t24, and the value of the second triangular wave 89 becomes lower than the straight line 84 (threshold) and PWM2 is at the low level from time t1 to time t4, from time t8 to time 01, from time t13 to time t16 and from time t20 to time t23. That is, PWM2 changes from the low level to the high level and then returns to the low level while PWM1 is at the low level (from time t8 to time t16).

The control signals SS1 to SS4 for respectively turning on or off the S1(31) to the S4(34) in the case where the second triangular wave 89 is used are calculated by the above-described mathematical expressions (5) to (8), and are shown in (g) to (j) of FIG. 12. SS1 and SS2 are signals similar to the signals described with reference to (g) and (h) of FIG. 6. SS3 is a signal that turns off the S3(33) at time t1 and turns on the S3(33) at time t11 in addition to the signal described with reference to (i) of FIG. 6. SS4, which is the signal that constantly turns on the S4(34) in (j) of FIG. 6, is a signal that turns off the S4(34) from time t0 to time t1, turns on the S4(34) from time t1 to time 01, and turns off the S4(34) from time t11 to time t13. In this way, in the operations, in addition to the operations described with reference to (a) to (j) of FIG. 6, the number of on/off operations of the switching elements during one period (from time t0 to time t12) of the first triangular wave 81 increases by two (time t1, time 01), and is four in total.

Therefore, the frequency of electromagnetic sound that is generated from the voltage converter 10 is a frequency that is four times as high as the frequency of the first triangular wave 81 as in the case of the operations described with reference to (a) to (d) of FIG. 7. When the frequency of the first triangular wave 81 is 10 kHz, it is possible to bring the frequency of generated electromagnetic sound to 40 kHz that is outside the human audible range, so it is possible to reduce noise of the voltage converter 10.

In the operations, the number of switching operations of each of the S1(31) and the S2(32) is similar to that of the operations described with reference to (a) to (j) of FIG. 6, so it is possible to reduce noise of the voltage converter 10 without increasing the number of switching operations of each of the S1(31) and the S2(32). Therefore, for example, even when the temperatures of the S1(31) and the S2(32) rise and it is difficult to increase the number of switching operations of each of the S1(31) and the S2(32), it is possible to effectively reduce noise.

As described above, each of the embodiments is able to effectively reduce noise by controlling the phases of PWM1 and PWM2 in the power supply system 100 that uses the voltage converter 10 that executes voltage conversion control over the two batteries (B1(20), B2(23)) by using the two pulse width modulation control signals (PWM1, PWM2).

What is claimed is:
1. A power supply system comprising:
a first battery;
a second battery;
a voltage converter including a plurality of switching elements, the plurality of switching elements being configured to bidirectionally convert a voltage between one or both of the first battery and the second battery and an output power line and switch a connection of the first battery and the second battery to the output power line between a series connection and a parallel connection; and
a controller configured to turn on or off the plurality of switching elements in accordance with pulse width modulation control, wherein
the output power line includes a first power line and a second power line, the second power line having a lower potential than a potential of the first power line,
the plurality of switching elements include first, second, third and fourth switching elements provided in series with each other in order from the first power line toward the second power line,
the first battery is connected in parallel with the third and fourth switching elements,
the second battery is connected in parallel with the second and third switching elements,
the controller is configured to, when a total high-level period that is a total period of a first high-level period and a second high-level period is shorter than a duty cycle period, control phases of pulse width modulation control signals such that the first high-level period and the second high-level period do not overlap with each other, the first high-level period being a high-level period of a first pulse width modulation control signal for controlling a first voltage conversion of a first voltage conversion circuit established between the first battery and the output power line, the second high-level period being a high-level period of a second pulse width modulation control signal for controlling a second voltage conversion of a second voltage conversion circuit established between the second battery and the output power line, the duty cycle period being a total period of low-level periods of the pulse width modu- lation control signals and the total period of the first and second high-level periods of the pulse width modulation control signals, and the controller is further configured to control each of the first, second, third, and fourth switching elements to be turned on or off in accordance with the first pulse width modulation control signal and the second pulse width modulation signal, so that an electronmagnetic sound, which is generated from on and off operations of the first, second, third, and fourth switching elements, falls beyond a human audible range.

2. The power supply system according to claim 1, wherein the controller is configured to, when each of the first high-level period and the second high-level period of the pulse width modulation control signals is lower than 50% of the duty cycle period, control the phases of the pulse width modulation control signals such that the first high-level period and the second high-level period alternately appear once every half period of the duty cycle period.

3. A power supply system comprising:
a first battery;
a second battery;
a voltage converter including a plurality of switching elements, the plurality of switching elements being configured to bidirectionally convert a voltage between one or both of the first battery and the second battery and an output power line and switch a connection of the first battery and the second battery to the output power line between a series connection and a parallel connection; and
a controller configured to turn on or off the plurality of switching elements in accordance with pulse width modulation control, wherein
the output power line includes a first power line and a second power line, the second power line having a lower potential than a potential of the first power line,
the plurality of switching elements include first, second, third and fourth switching elements provided in series with each other in order from the first power line toward the second power line,
the first battery is connected in parallel with the third and fourth switching elements,
the second battery is connected in parallel with the second and third switching elements,
the controller is configured to, when a total high-level period that is a total period of a first high-level period and a second high-level period is shorter than a duty cycle period, execute phase control by mixing a first control with a second control, the first high-level period being a high-level period of a first pulse width modulation control signal for controlling a first voltage conversion of a first voltage conversion circuit established between the first battery and the output power line, the second high-level period being a high-level period of a second pulse width modulation control signal for controlling a second voltage conversion of a second voltage conversion circuit established between the second battery and the output power line, the duty cycle period being a total period of each of low-level periods of pulse width modulation control signals and the total period of the first and second high-level periods of the pulse width modulation control signals, the first control being a control in which phases of the pulse width modulation control signals are controlled such that the first high-level period of the first pulse width modulation control signal and the second high-level period of the second pulse width modulation control signal overlap with each other, the second control being a control in which the phases of the pulse width modulation control signals are controlled such that the first high-level period of the first pulse width modulation control signal and the second high-level period of the second pulse width modulation control signal do not overlap with each other, and the controller is further configured to control each of the first, second, third, and fourth switching elements to be turned on or off in accordance with the first pulse width modulation control signal and the second pulse width modulation signal, so that an electromagnetic sound, which is generated from on and off operations of the first, second, third, and fourth switching elements, falls beyond a human audible range.

4. A power supply system comprising:
a first battery;
a second battery;
a voltage converter including a plurality of switching elements, the plurality of switching elements being configured to bidirectionally convert a voltage between one or both of the first battery and the second battery and an output power line and switch a connection of the first battery and the second battery to the output power line between a series connection and a parallel connection; and
a controller configured to turn on or off the plurality of switching elements in accordance with pulse width modulation control, wherein
the output power line includes a first power line and a second power line, the second power line having a lower potential than a potential of the first power line,
the plurality of switching elements include first, second, third and fourth switching elements provided in series with each other in order from the first power line toward the second power line,
the first battery is connected in parallel with the third and fourth switching elements,
the second battery is connected in parallel with the second and third switching elements,
the controller is configured to, during a period in which a first pulse width modulation control signal for controlling a first voltage conversion of a first voltage conversion circuit established between the first battery and the output power line is at a low level, change a second pulse width modulation control signal for controlling a second voltage conversion of a second voltage conversion circuit established between the second battery and the output power line from the low level to a high level and then return to the low level, and
the controller is further configured to control each of the first, second, third, and fourth switching elements to be turned on or off in accordance with the first pulse width modulation control signal and the second pulse width modulation signal, so that and electromagnetic sound, Which is generated from on and off operations of the first, second, third, and fourth switching elements, falls beyond a human audible range.

5. The power supply system according to claim 4, wherein the controller is configured to generate the first pulse width modulation control signal based on a first triangular wave and a first threshold, generate the second pulse width modulation control signal based on a second triangular wave and a second threshold, and, during the period in which the first pulse width modulation control signal is at the low level, raise a frequency of the second triangular wave beyond a frequency of the first triangular wave.

6. The power supply system according to claim 5, wherein the controller is configured to, during the period in which the first pulse width modulation control signal is at the low level, raise the frequency of the second triangular wave beyond the frequency of the first triangular wave such that a period during which a value of the second triangular wave exceeds the second threshold and a period during which the value of the second triangular wave does not exceed the second threshold appear.

* * * * *